(12) United States Patent
Culmer (10) Patent No.: US 8,794,414 B2
(45) Date of Patent: Aug. 5, 2014

(54) COUPLING ASSEMBLY

(75) Inventor: Jeremy Steven Culmer, Parma, OH (US)

(73) Assignee: Eaton Corporation, Cleveland, OH (US)

( * ) Notice: Subject to any disclaimer, the term of this patent is extended or adjusted under 35 U.S.C. 154(b) by 1778 days.

(21) Appl. No.: 11/900,119

(22) Filed: Sep. 10, 2007

(65) Prior Publication Data

US 2009/0065320 A1  Mar. 12, 2009

(51) Int. Cl.
*F16D 65/853* (2006.01)
*F16D 13/72* (2006.01)

(52) U.S. Cl.
USPC .............. 192/70.12; 192/113.31; 188/71.6; 188/264 D (58) Field of Classification Search
CPC ........... F16D 2065/784; F16D 65/853; F16D 2065/1328; F16D 13/72
USPC ........... 192/113.3, 113.31, 70.12; 188/264 B, 188/264 D, 264 CC, 264 F, 71.6
See application file for complete search history.

(56) References Cited

U.S. PATENT DOCUMENTS

| | | | | |
|---|---|---|---|---|
| 2,934,178 A | * | 4/1960 | Eaton | 188/264 D |
| 2,986,238 A | * | 5/1961 | Eaton | 188/251 M |
| 3,044,582 A | * | 7/1962 | Gold et al. | 188/264 D |
| 3,047,105 A | * | 7/1962 | Schwartz | 188/264 D |
| 3,530,965 A | | 9/1970 | Wilson | |
| 3,648,814 A | * | 3/1972 | Barron | 192/113.31 |
| 4,013,148 A | | 3/1977 | Kobelt | |
| 4,262,789 A | | 4/1981 | Collins | |
| 4,422,540 A | | 12/1983 | Sommer | |
| 4,828,089 A | | 5/1989 | Collins et al. | |
| 5,178,248 A | | 1/1993 | Latsko | |
| 5,257,684 A | | 11/1993 | Collins | |
| 5,358,077 A | | 10/1994 | DeConti | |
| 5,577,581 A | | 11/1996 | Eberwein et al. | |
| 6,637,568 B2 | | 10/2003 | Latsko | |
| 7,374,027 B2 | | 5/2008 | Mayberry et al. | |
| 2007/0095622 A1 | | 5/2007 | Mayberry | |

FOREIGN PATENT DOCUMENTS

| | | |
|---|---|---|
| DE | 20 39 287 A1 | 2/1972 |
| DE | 44 26 540 A1 | 3/1995 |
| DE | 199 00 338 A1 | 8/1999 |
| EP | 0 138 345 A | 4/1985 |

* cited by examiner

*Primary Examiner* — David D Le
*Assistant Examiner* — Terry Chau
(74) *Attorney, Agent, or Firm* — Tarolli, Sundheim, Covell & Tummino LLP (57) ABSTRACT

A coupling assembly for use in transmitting force includes a housing which at least partially encloses a rotatable disc. The housing has a plate portion with an annular force transmitting surface which is engagable with the rotatable disc. A cooling fluid channel is at least partially defined by a side of the plate portion opposite from the force transmitting surface. A plurality of projections extend into a path of flow of cooling fluid through the cooling fluid channel. A cooling fluid inlet includes a passage having a portion with a large cross section connected in fluid communication with a radially outer portion of the cooling fluid channel. A portion of the inlet passage having a small cross section is connected in fluid communication with a radially inner portion of the cooling fluid channel. Ribs extend across the radially inner and outer portions of the cooling fluid channel.

4 Claims, 5 Drawing Sheets

COUPLING ASSEMBLY

BACKGROUND OF THE INVENTION

The present invention relates to a new and improved coupling assembly which may be a clutch and/or brake.

A known coupling assembly which is utilized as a brake is disclosed in U.S. Pat. No. 4,262,789. This known coupling assembly utilizes a flow of cooling fluid (water) to cool copper wear plates which engage a rotor to retard relative rotation between the rotor and a housing. Other known coupling assemblies are disclosed in U.S. Pat. Nos. 3,530,965 and 5,577,581.

During use of these known coupling assemblies, heat is generated upon operation of the coupling assembly from a disengaged condition to an engaged condition. It has been suggested that components of the coupling assembly may be exposed to a flow of cooling fluid (water) to transfer heat from components of the coupling assembly to the cooling fluid. Even though the components of these known coupling assemblies are exposed to a flow of cooling fluid, there tends to be a build up of heat in the components of the coupling assemblies. Under very severe operating conditions, the build up of heat may tend to become excessive at hot spots on components of the coupling assembly.

SUMMARY OF THE INVENTION

The present invention provides a new and improved coupling assembly having an improved flow of cooling fluid to promote the transfer of heat from components of the coupling assembly. Convective heat transfer from components of the coupling assembly to the flow of cooling fluid may be promoted by increasing the velocity of the cooling fluid at spaced apart areas along a channel through which the cooling fluid flows. Upon engagement of the coupling assembly, more heat tends to be generated at a radially outer portion of a rotating disc than at a radially inner portion of the disc. To remove this heat, the flow of cooling fluid adjacent to the radially outer portion of the rotating disc may be larger than adjacent to the radially inner portion of the rotating disc.

The coupling assembly may include the rotatable disc which is at least partially enclosed by a housing. The housing may have a plate portion with a force transmitting surface which is engagable with a side surface area on the rotatable disc to retard relative rotation between the housing and the disc. The housing may also have a cooling fluid channel which is at least partially defined by the side of the plate portion opposite from the force transmitting surface.

To improve heat transfer and minimize the occurrence of hot spots, a plurality of projections may extend into a path of flow of cooling fluid through the cooling fluid channel. Turbulence may be induced in a flow of cooling fluid by having ribs project into the cooling fluid channel.

A fluid inlet to the cooling fluid channel may have a relatively large cross sectional area connected in fluid communication with a radially outer portion of the cooling fluid channel. The inlet may have a relatively small cross sectional area connected in fluid communication with a radially inner portion of the cooling fluid channel.

A coupling assembly constructed in accordance with the present invention has many different features which may advantageously be utilized together as disclosed herein. However, these features may be utilized separately or in combination with various features from the prior art. For example, the cooling fluid inlet with different sizes for radially inner and radially outer portions of the cooling fluid channel may be utilized without projections into the cooling fluid channel. As another example, the projections may or may not includes ribs.

Although the coupling assembly disclosed herein is utilized as a brake, it should be understood that the coupling assembly may be utilized as a clutch. It is contemplated that the coupling assembly may be a combination clutch and brake assembly.

BRIEF DESCRIPTION OF THE DRAWINGS

The foregoing and other features of the invention will become more apparent upon a consideration of the following description taken in connection with the accompanying drawings wherein.

DESCRIPTION OF ONE EMBODIMENT OF THE INVENTION

Figure 1:
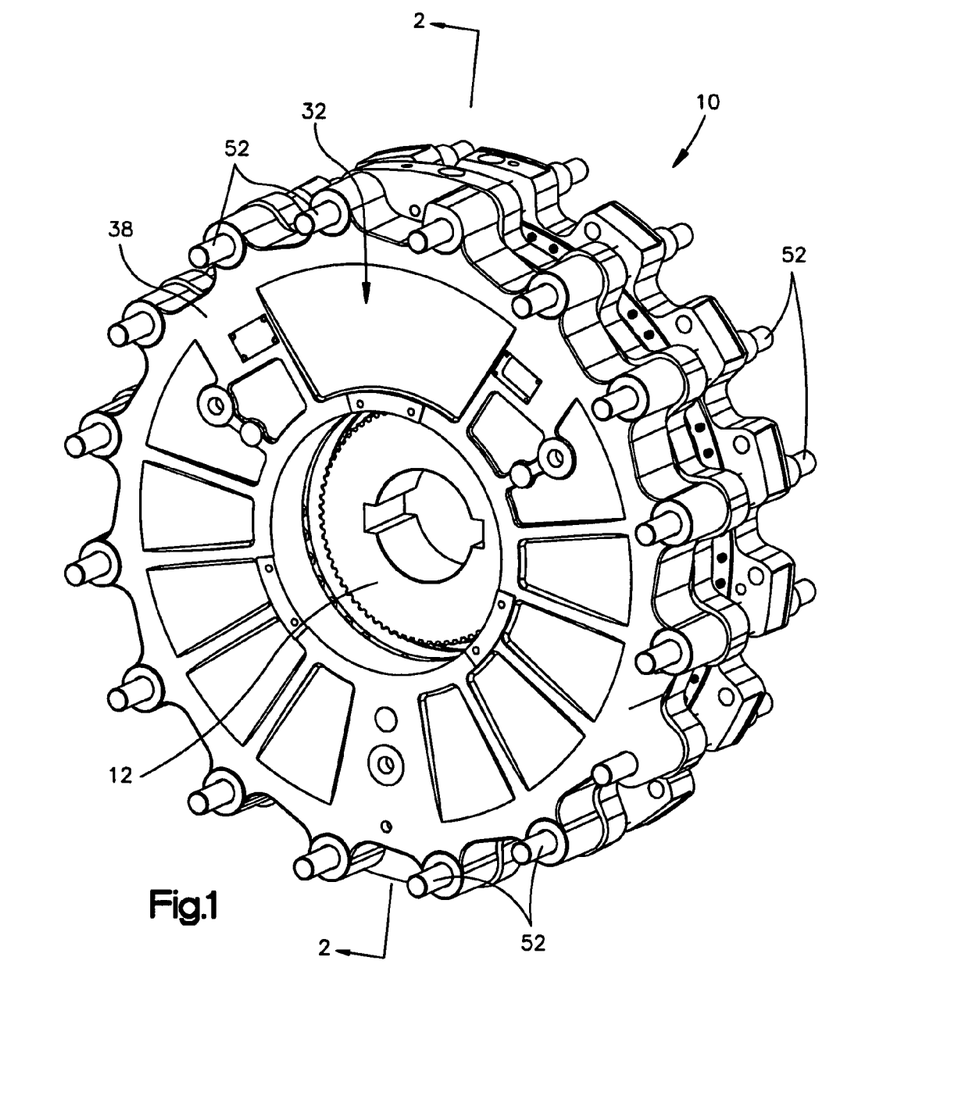
FIG. 1 is a front elevational view of a coupling assembly constructed in accordance with the present invention.
Figure 2:
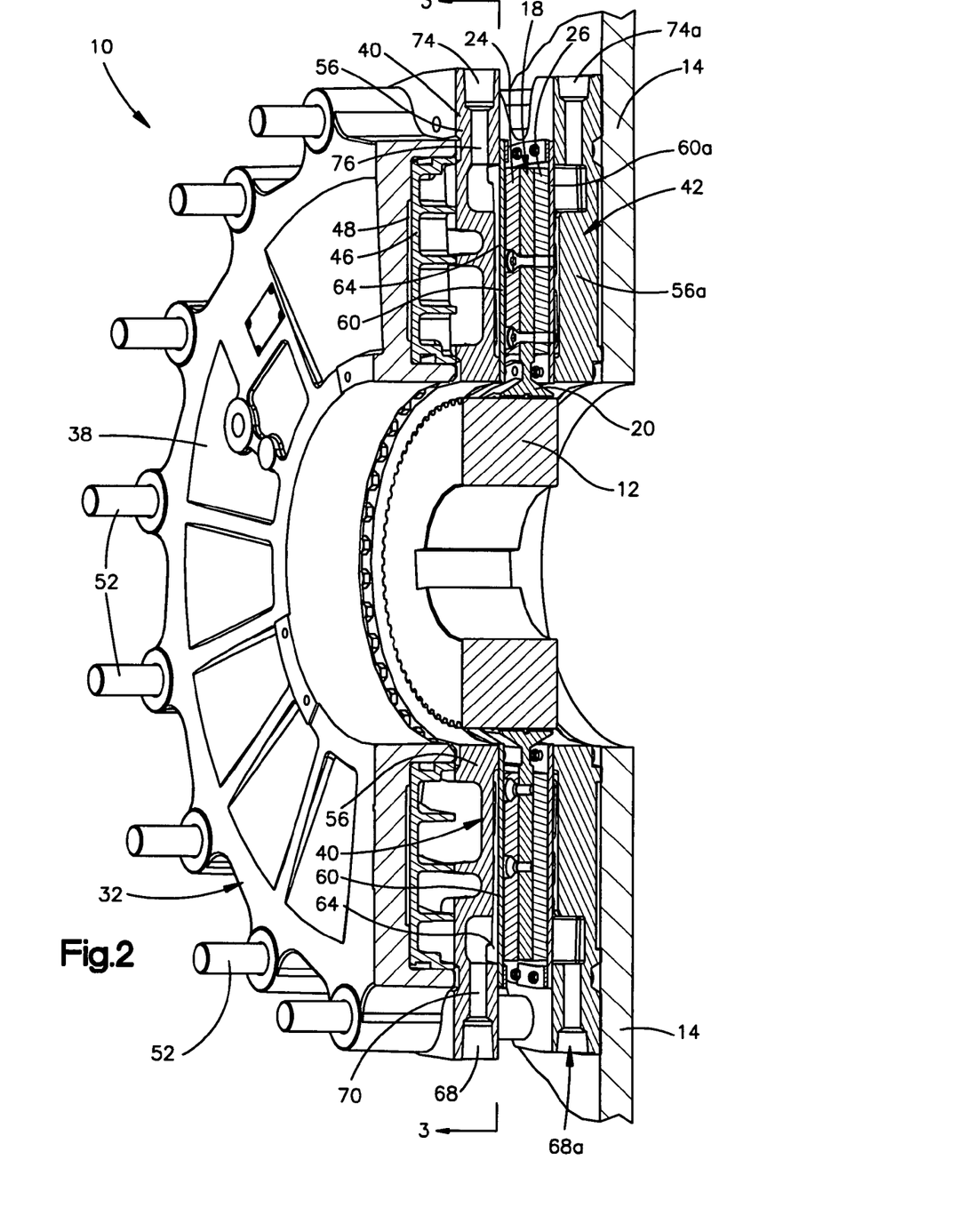
FIG. 2 is an enlarged sectional view, taken generally along the line 2-2 of FIG. 1, further illustrating the construction of the coupling assembly.

A coupling assembly 10 (FIGS. 1 and 2) is utilized to transmit force between a rotatable input member 12 and a stationary member 14 (FIG. 2). In the illustrated embodiment of the invention, the coupling assembly 10 is utilized as a brake and force is transmitted between the stationary member 14 and input member 12 by the coupling assembly 10 to hold the input member against rotation. If the coupling assembly 10 is to be utilized as a clutch, the member 14 would be rotatable under the influence of force transmitted from the input member 12 through the coupling assembly 10 to the member 14. It should be understood that the coupling assembly 10 may be a combination brake and clutch assembly.

The coupling assembly 10 (FIG. 2) includes a rotatable annular disc 18 to which the input member 12 is connected. In the illustrated embodiment of the invention, the input member 12 is a gear which is connected to a rotatable input shaft (not shown). A circular array of teeth on the periphery of the gear 12 are received in meshing engagement with corresponding teeth formed in a radially inner portion 20 of the disc 18. Annular friction pads or members 24 and 26 are mounted on axially opposite sides of the disc 18 in a coaxial relationship with the disc and the input member 12.

The disc 18 is at least partially enclosed by a housing assembly 32. The housing assembly 32 is fixedly connected to the member 14. As was previously mentioned, when the coupling assembly 10 is utilized as a brake, the member 14 is stationary. However, if the coupling assembly 10 is utilized as a clutch, the housing assembly 32 and member 14 may be rotatable.

The housing assembly 32 includes a cover or cylinder 38, a movable pressure plate 40 (FIGS. 2-6), and a mounting flange or stationary pressure plate 42 (FIG. 2). An annular piston 46 (FIG. 2) is mounted in an annular chamber 48 formed in the cover or cylinder 38. The cover or cylinder 38 and mounting flange 42 are fixedly interconnected so that they can not move axially or rotate relative to each other. However, the pressure plate 40 is movable along axially extending support posts 52 under the influence of force transmitted from the piston 46 to the pressure plate 40.

When the chamber 48 is pressurized with a suitable fluid, such as air, the piston 46 firmly presses the pressure plate 40 against the friction pad 24 disposed on the left (as viewed in FIG. 2) side of the disc 18. This force causes the disc 18 to move axially along the teeth on the input member 12 to press the right (as viewed in FIG. 2) friction pad 26 against the mounting flange or pressure plate 42. Since the mounting flange or pressure plate 42 is fixedly connected to the stationary member 14, this results in the disc 18 being firmly gripped between the pressure plate 40 and mounting flange or pressure plate 42 to retard rotation of the disc relative to the housing assembly 32.

The annular movable pressure plate 40 includes a base 56 (FIGS. 3 and 4) and a plate portion 60. The annular plate portion 60 is fixedly connected to and is coaxial with the annular base 56. The plate portion 60 cooperates with the base 56 to form an annular cooling fluid channel 64 having a central axis 65.

Figures 3, 4:
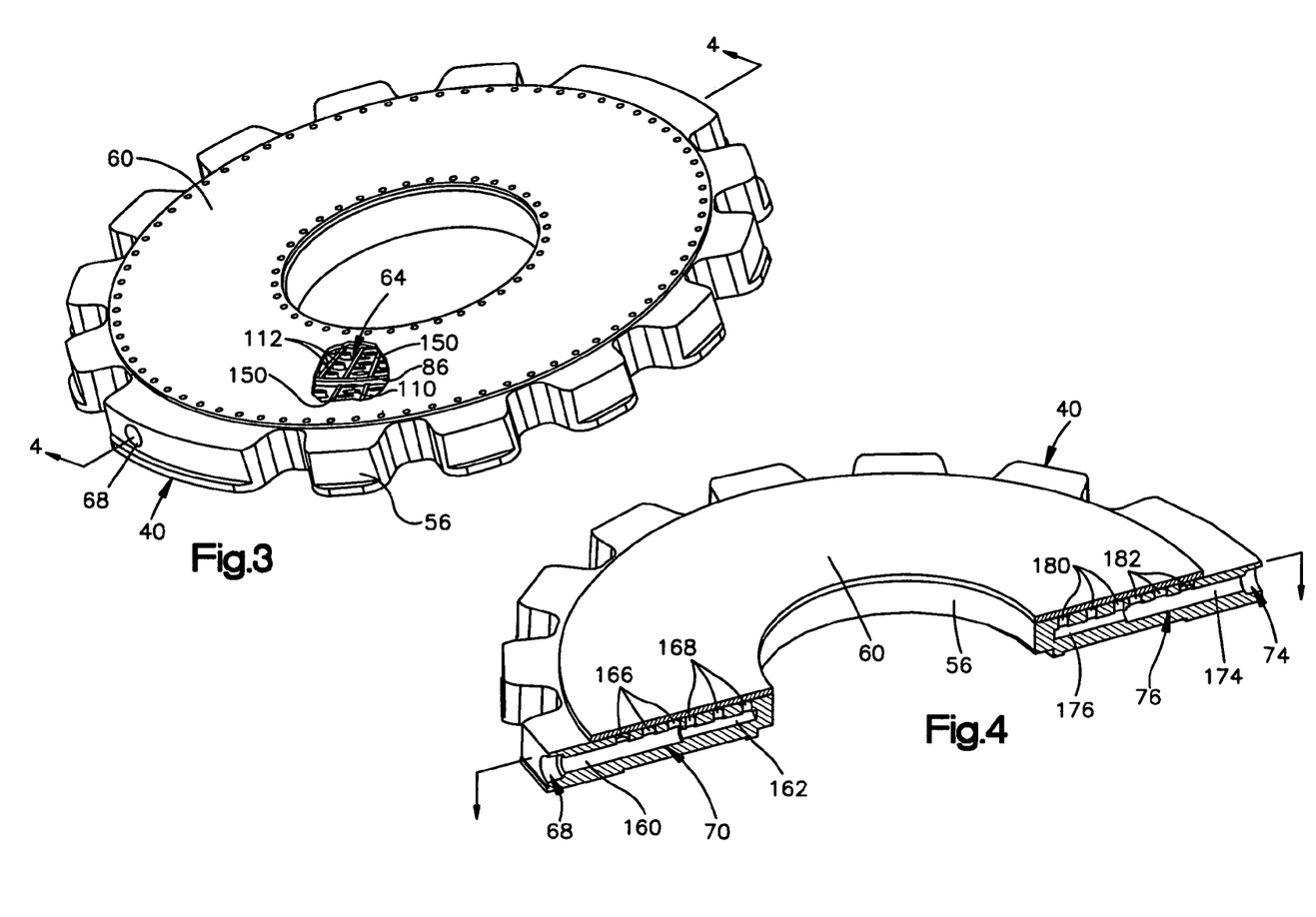
FIG. 3 is a partially broken away pictorial illustration, taken generally along the line 3-3 of FIG. 2, illustrating the relationship of a wear plate to another portion of the housing of the coupling assembly.
FIG. 4 is a sectional view, taken generally along the line 4-4 of FIG. 3, illustrating the relationship of a cooling fluid inlet and a cooling fluid outlet to a portion of the housing of the coupling assembly of FIGS. 1 and 2.

The annular cooling fluid channel 64 has an inlet 68 (FIGS. 2, 3 and 4) formed in the base 56 of the pressure plate 40. Fluid flow through the inlet 68 is conducted along an inlet passage 70 (FIG. 4) in the base 56. The inlet passage 70 is connected in fluid communication with the cooling fluid channel 64 (FIGS. 2 and 3). In the illustrated embodiment of the invention, the cooling fluid conducted through the cooling fluid channel 64 is water. However, a different cooling fluid may be used if desired.

Fluid is conducted from the annular cooling fluid channel 64 to an outlet 74 (FIG. 4) connected in fluid communication with the cooling fluid channel 64 through an outlet passage 76 (FIGS. 2 and 4). Fluid flows from the cooling fluid channel 64 through the outlet passage 76 and outlet 74. The outlet passage 76 is located diametrically opposite from the inlet passage 70.

When the coupling assembly 10 is in the disengaged condition (FIG. 2), the input member 12 and disc 18 are rotated by a drive shaft (not shown) which is connected to the input member. At this time, the friction pad 24 is spaced from the wear plate portion 60 of the pressure plate 40. Similarly, the friction pad 26 is spaced from the stationary mounting flange or pressure plate 42.

When the coupling assembly 10 is operated from the disengaged condition toward the engaged condition, the piston 64 (FIG. 2) moves the pressure plate 40 axially toward the rotating disc 18. This results in sliding engagement of the wear plate portion 60 of the pressure plate 40 with the friction pad 24 on the rotating disc 18. Engagement of the wear plate portion 60 of the pressure plate 40 with the friction pad 24 results in the generation of heat as the friction pad slides along the surface of the wear plate portion. This heat is transferred through the wear plate portion 60 to cooling fluid (water) in the cooling fluid channel 64.

Although the wear plate portion 60 may be formed of many different materials, in the illustrated embodiment of the invention, the wear plate portion 60 is formed of copper or a copper alloy. The copper material of the wear plate portion 60 is effective to conduct heat to the cooling fluid in the annular cooling fluid channel 64. The heat which is transferred to the cooling fluid in the cooling fluid channel 64 is conducted from the coupling assembly 10 in the flow of cooling fluid (water) from the outlet 74. This prevents excessive heating of the wear plate portion 60 and other components of the coupling assembly 10.

The cooling fluid channel 64 is constructed so as to promote the transfer of heat from the wear plate portion 60 to a flow of cooling fluid in the cooling fluid channel. The transfer of heat to fluid in the cooling fluid channel 64 is promoted by reducing the depth, that is, the axial extent, of the annular cooling fluid channel. Since the volumetric rate of flow of fluid in the cooling fluid channel remains constant, reducing the depth of the cooling fluid channel 64 increases the velocity of the cooling fluid to increase the rate of heat transfer. In addition, improved heat transfer is promoted by providing for a greater flow of cooling fluid in a radially outer portion of the cooling fluid channel 64 than in a radially inner portion of the cooling fluid channel.

In addition to promoting improved heat transfer by reducing the depth of the cooling fluid channel 64, heat transfer is improved by having areas of increased flow of turbulence. The increased flow turbulence promotes mixing of cooling fluid moving along an inner side of the plate portion 60 with cooling fluid moving along an inner side of the base 56 of a pressure plate 40. Although the cross sectional area of the cooling fluid channel 64 is reduced, the volumetric rate of flow of cooling fluid through cooling fluid channel is not reduced. Of course, this results in an increase in the velocity at which the fluid flows through the cooling fluid channel 64.

The cooling fluid channel 64 has an annular configuration which corresponds to the annular configuration of the plate portion 60 of the pressure plate 40. The cooling fluid flows in opposite directions, that is, clockwise and counterclockwise, from the inlet 68 (FIGS. 2, 3, 4, 5 and 6) to the outlet 74 (FIGS. 2 and 4). The cooling fluid flow is divided into a fluid flow in one direction and a fluid flow in the opposite direction immediately after the cooling fluid flows from the inlet passage 70 (FIG. 4) into the cooling fluid channel 64 (FIG. 5).

The cooling fluid channel 64 is divided into an annular radially outer cooling fluid channel section 82 (FIGS. 5-7) and an annular radially inner cooling fluid channel section 84 by an axially projecting annular wall portion or rib 86. The radially outer and radially inner channel sections 82 and 84 have the same radial extent. Thus, the distance from the radially outer side 90 (FIG. 7) of the annular wall portion or rib 86 to a circular radially inwardly facing side 92 of the radially outer channel section 82 is the same as the distance from a circular radially inner side 94 of the wall section or rib 86 to a circular radially outwardly facing side 96 of the cooling fluid channel 64.

Figure 5:
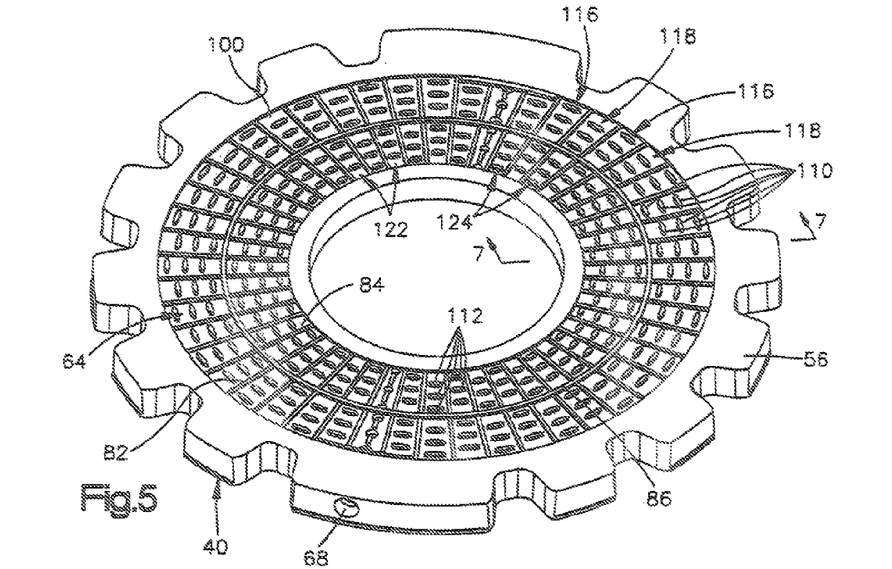
FIG. 5 is a plan view, taken generally along the line 5-5 of FIG. 4, illustrating the construction of one side of a cooling fluid channel formed in the housing of the coupling assembly of FIGS. 1 and 2.

The annular wall section or rib 86 cooperates with the wear plate portion 60 (FIG. 3) of the pressure plate 40 and the base 56 of the pressure plate to define the radially outer and radially inner cooling fluid channel sections 82 and 84 (FIG. 5). The flat, axially inner major side of the wear plate portion 60 engages the axially projecting wall section or rib 86 to block fluid flow across the wall section or rib 86.

The radially outer channel section 82 (FIG. 7) has an annular bottom surface 100. The bottom surface 100 extends from the outer side 90 of the annular wall portion or rib 86 to the inwardly facing side 92 of the base 56. Similarly, the radially inner channel section 84 has an annular bottom surface 102 formed on the base 56. The annular bottom surface 102 extends from the radially inner side 94 of the annular wall section or rib 86 to the radially outwardly facing side 96 of the base 56.

Figure 7:
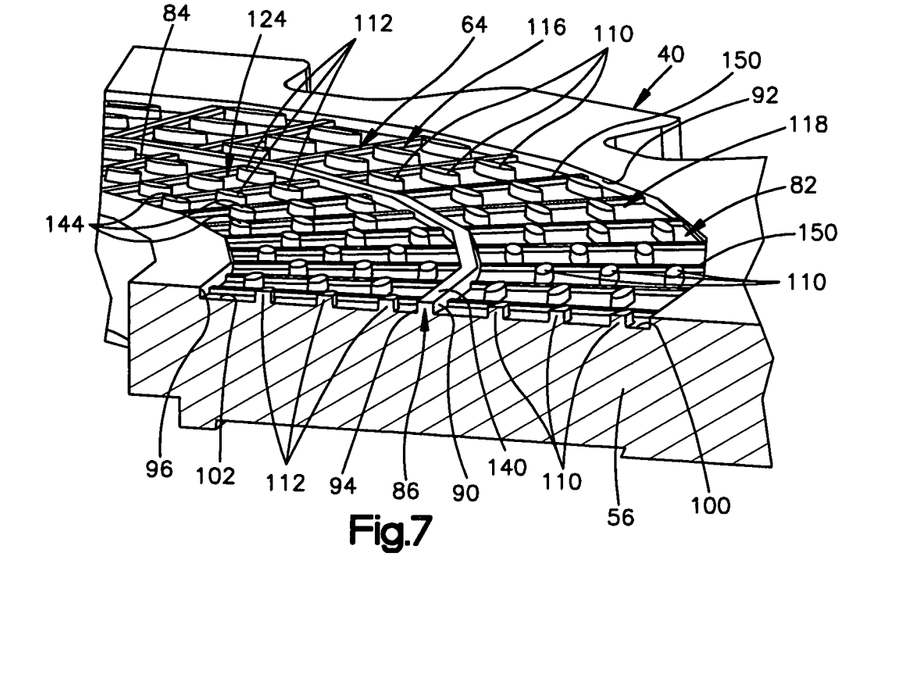
FIG. 7 is an enlarged fragmentary sectional view, taken generally along the line 7-7 of FIG. 5, further illustrating the construction of projections which extend into the cooling fluid channel.

The bottom surface 100 on the radially outer channel section 82 is spaced the same distance from the inwardly facing flat major side surface of the wear plate 60 as is the bottom surface 102 on the radially inner channel section 84. The bottom surface 100 on the radially outer channel section 82 is disposed in a coplanar relationship with the bottom surface 102 on the radially inner channel section 84. Therefore, the radially outer and inner channel sections 82 and 84 have the same uniform depth throughout their extent. However, one channel section 82 or 84 could be deeper than the other channel section if desired.

In the specific embodiment of the invention illustrated in FIGS. 1-7, the radially outer and radially inner channel sections 82 and 84 had a depth of approximately 190 thousandths of an inch. By reducing the depth of the cooling fluid channel 64 while maintaining the same volumetric flow rate of fluid through the cooling fluid channel, the velocity of the flow of fluid in the cooling fluid channel 64 is increased. It should be understood that the radially outer and radially inner channel sections 82 and 84 may have a depth which is different than the foregoing specific depth. For example, the depth of the radially outer channel section 82 may be different than the depth of the radially inner channel section 84. Alternatively, the radially outer channel section 82 and radially inner channel section 84 may have the same depth which is different than the specific depth previously set forth herein.

A plurality of projections 110 extend axially upwardly or outwardly (as viewed in FIG. 7) from the bottom surface 100 of the radially outer channel section 82. Similarly, a plurality of projections 112 extend axially upwardly or outwardly (as viewed in FIG. 7) from the bottom surface 102 of the radially inner channel section 84. The projections 110 and 112 have the same general configuration. However, the length, as measured along annular coaxial central axes of the radially outer channel section 82 and radially inner channel section 84, increases in a radially outward direction (see FIG. 6).

The projections 110 and 112 are divided into a plurality of groups along the length of the radially outer and radially inner channel sections 82 and 84. Thus, there are groups 116 (FIG. 7) of projections interspersed with groups 118 of projections in the radially outer channel section 82. Similarly, there are groups 122 of projections interspersed with groups 124 of projections in the radially inner channel section 84. The groups 116 of projections in the radially outer channel section 82 are radially offset from the groups 118 of projections in the radially outer channel section. Similarly, the groups 122 of projections in the radially inner channel section 84 are radially offset from the groups 124 of projections in the radially inner channel section.

Although there are the same number of projections 110 or 112 in each of the groups 116, 118, 122 and 124 of projections, different numbers of projections may be provided in different groups of projections. For example, a larger number of projections 110 could be provided in the group 116 of projections than in the group 118. Similarly, a larger number of projections 112 could be provided in the group 122 of projections than in the group 124.

By having the projections in the groups 116, 118, 122 and 124 (FIG. 7) of projections radially offset from each other, the fluid flow through the radially outer and radially inner channel sections 82 and 84 is diverted somewhat to thereby promote turbulence in the flow of fluid and the transfer of heat from the plate portion 60 (FIGS. 3 and 4) to the cooling fluid flowing in the radially outer and inner channel sections 82 and 84. Of course, the projections in the group 116 of projections may be radially aligned with the projections in the group 118 if desired. Similarly, the projections in the group 122 of projections may be radially aligned with the projections in the group 124 of projections.

The projections 110 and 112 have an elongated configuration with their longitudinal central axes 111 extending along the circular longitudinal central axes of the radially outer and radially inner channel sections 82 and 84. The projections 110 and 112 have linear longitudinal central axes. However, the projections 110 and 112 may have arcuate longitudinal central axes. If desired, the longitudinal central axes of the projections 110 and 112 may have an arcuate configuration with a center of curvature which is coincident with a center of curvature of the annular wall section or rib 86.

The projections 110 and 112 have axially tapered opposite end portions. A projection 110 (FIG. 8) has a generally rectangular body section 130. The projection 110 has axially tapered end portions 132 and 134 at opposite ends of the body section 130. The body section 130 is connected with the bottom surface 100 of the radially outer channel section 82 by an arcuately chamfered side area 136 which extends around the projection 110.

The projection 110 has a flat upper (as viewed in FIG. 8) side surface 138 which extends parallel to the bottom surface 100 of the radially outer channel section 82. The flat upper side surfaces 138 of the projections 110 are disposed in the same plane as a flat annular upper (as viewed in FIG. 7) side surface 140 of the wall section or rib 86. The projections 112 have the same configuration as the projections 110. The projections 112 have flat upper (as viewed in FIG. 7) side surfaces 144 which are disposed in the same plane as the flat upper side surface 140 of the wall section or rib 86.

When the coupling assembly 10 (FIG. 2) is in the disengaged condition, the flat inner side surface of the wear plate portion 60 just touches or is very slightly spaced from the flat upper side surfaces 138 on the projections 110, the flat upper side surface 140 on the wall section or rib 86, and the flat upper side surfaces 144 on the projections 112 (FIG. 7). When the coupling assembly 10 is in the engaged condition, the flat inner side surface of the wear plate portion 60 (FIG. 3) is in disposed in abutting engagement with the flat upper side surfaces 138 on the projections 110, the flat upper side surface 140 on the wall section or rib 86, and the flat upper side surfaces 144 on the projections 112 (FIG. 7). Therefore, when the coupling assembly 10 is in the engaged condition, the wear plate portion 60 is supported by engagement of the flat inner side surface of the wear plate portion with the wall section or rib 86, projections 110, and projections 112. This promotes uniform sliding engagement of the outer or upper (as viewed in FIGS. 3 and 4) side surface of the wear plate portion 60 with the friction pad 24 (FIG. 2) as the coupling assembly 10 is operated to the engaged condition.

During a flow of cooling fluid along the radially outer channel section 82 (FIG. 7), the projections 110 reduce the area which is available for cooling fluid flow. Therefore, the cooling fluid flow accelerates around the projections 110. The end portions 132 and 134 (FIG. 8) of the projections 110 are tapered in such a manner as to promote smooth cooling fluid flow around both of the end portions 132 and 134 of the projection 110. By promoting this smooth fluid flow, relatively stagnant areas in the fluid flow are minimized adjacent to both end portions 132 and 134 of the projections 110.

Figure 8:
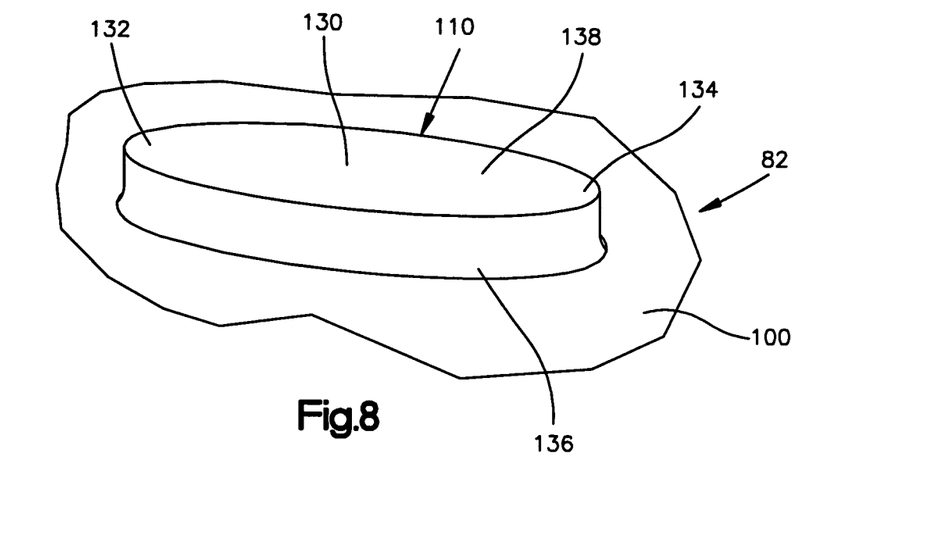
FIG. 8 is a schematic pictorial illustration of one of the projections of FIG. 7.

If stagnant areas are established in the flow of fluid through the radially outer channel section 82, hot spots may develop in the portion of the wear plate portion 60 adjacent to the stagnant areas. Thus, if the projection 110 had blunt end portions 132 and 134, rather than the illustrated tapered end portions, there will be a tendency for stagnant areas to develop in the fluid flow, particularly adjacent to the downstream end portion of the projection 110. By tapering the end portions 132 and 134 of the projection 110, these relatively stagnant areas are minimized with the resulting minimization of hot spots in the wear plate portion 60.

In the embodiment of the invention illustrated in FIGS. 1-8, the projections 110 and 112 (FIG. 7) are integrally formed as one piece with the base 56 of the pressure plate 40. The inner side of the wear plate portion 60 (FIG. 3) faces toward the projections 110 and 112 and has a flat planar surface which is free of projections. However, if desired, the inner side surface of the wear plate portion 60 may be provided with projections. The projections on the inner side surface of the wear plate portion 60 may be interspersed with projections on the base 56 of the pressure plate 40. Alternatively, the projections 110 and 112 on the base 56 of the pressure plate 40 may be omitted and only projections provided from the inner side surface of the wear plate portion 60.

Whether the projections 110 and 112 are formed on the base 56 or on the wear plate portion 60, the projections may be integrally formed with either or both of the base and/or wear plate portion 60. However, the projections may be formed separately from the base 56 and/or wear plate portion 60 and attached to the base and/or wear plate portion if desired.

In the embodiment of the invention illustrated in FIGS. 1-8, the projections 110 and 112 all have the same general configuration. The projections 110 and 112 differ from each other only in their length. That is, the extent of the projections along the annular central axes of the radially outer and inner channel sections 82 and 84. If desired, the projections 110 and 112 may have the same length. It is contemplated that the projections 110 and 112 may have configurations which are different from each other and different from the illustrated configurations. For example, the projections 110 and/or 112 may have tear drop cross sectional configuration in a plane parallel to the bottom surfaces 100 and/or 102 of the radially outer and radially inner channel sections 82 and 84. It is contemplated that some of the projections 110 can have one configuration and other of the projections 110 have a different configuration. Of course, some of the projections 112 could have one configuration and other of the projections 112 could have a different configuration.

In addition to the projections 110 and 112, a plurality of ribs 150 (FIG. 7) project into the cooling fluid channel 64. The ribs 150 having longitudinal central axes 151. Thus, the ribs 150 are projections which extend between the radially inwardly facing outer side 92 (FIG. 7) of the cooling fluid channel 64 and the radially outwardly facing inner side 90 on the wall section on rib 86. In addition, the ribs 150 extend between the radially inwardly facing side 94 of the wall section or rib 86 and the radially outwardly facing side 96 of the cooling fluid channel 64. Although the ribs 150 extend along radii of the annular cooling fluid channel 64, the ribs 150 may be skewed relative to the radii of the cooling fluid channel 64 if desired.

The height of the ribs 150 is less than the height of the wall section or rib 86 which divides the cooling fluid channel 64 into a radially outer channel section 82 and a radially inner channel section 84. The wall section or rib 86 is engaged by the wear plate portion 60 and cooperates with the wear plate portion to block fluid flow between the radially outer and radially inner channel sections 82 and 84. However, the ribs 150 are spaced from the wear plate portion 60, that is, the upper (as viewed in FIG. 7) sides of the ribs 150 are spaced from the lower or inner side of the wear plate 60.

Although the ribs 150 in the radially outer channel section 82 are radially aligned with the ribs 150 in the radially inner channel section 84, the ribs in one channel section may be offset from the ribs in the other channel section. If desired, the ribs 150 may be offset by a distance sufficient to enable a plurality of projections 110 and/or 112 to be located between adjacent ribs at substantially the same radial distance from a center of curvature of the cooling fluid channel 64.

During flow of cooling fluid along the radially outer and inner channel sections 82 and 84, the cooling fluid flows over the ribs 150 in the restricted space between the inner side of the wear plate portion 60 and the upper sides of the ribs 150. The ribs 150 increase the velocity of the cooling fluid and induce turbulence in the cooling fluid. The turbulence which is induced in the flow of cooling fluid by the ribs 150 causes the cooling fluid to impinge against the inner side of the wear plate portion 160. This turbulence promotes mixing of fluid in the area of the ribs.

In addition, the ribs 150 decrease the cross sectional area of the cooling fluid channel 64 at the ribs 150. Thus, the cooling fluid flow area at the ribs 150 is reduced to the area between the upper (as viewed in FIG. 7) side surfaces of the ribs and the inner major side surface of the wear plate portion 60. By decreasing the area available for cooling fluid flow, the velocity of the cooling fluid is increased as it flows across the ribs 150. Increasing the velocity of the cooling fluid further promotes turbulence in the fluid flow adjacent to the ribs 150.

Although it is believed to be advantageous to use the ribs 150 in combination with the projections 110 and 112, it should be understood that the ribs 150 may be used either with or without the projections 110 and 112. Alternatively, the projections 110 and 112 may be used with or without the ribs 150. Although it is preferred to utilize the wall section or rib 86 to divide cooling fluid channel 64 into radially inner and radially outer channel sections 82 and 84, the wall section or rib 86 may be omitted.

When the coupling assembly 10 is operated from the disengaged condition of FIG. 1 to the engaged condition, the wear plate portion 60 of the pressure plate 40 is pressed against the rotating friction pad 24 on the disc 18. The radially outer portion of the disc 18 is rotating at a higher velocity than the radially inner portion of the disc. Therefore, as the coupling assembly 10 is operated from the disengaged condition to the engaged condition, more heat is generated adjacent to the radially outer portion of the wear plate portion 60 than is generated adjacent to the radially inner portion of the wear plate portion.

To promote cooling of the radially outer portion of the wear plate portion 60, where the greatest amount of heat is generated during operation of the coupling to the engaged condition, the inlet 68 (FIG. 4) is effective to direct a greater flow of cooling fluid to the radially outer channel section 82 (FIGS. 5-7) than to the radially inner channel section 84. To provide for the larger fluid flow through the radially outer channel section 82, a cylindrical radially outer initial portion 160 (FIG. 4) of the inlet passage 70 has a larger diameter than a cylindrical radially inner second portion 162 of the inlet passage 70.

The relatively large diameter initial portion 160 of the inlet passage 70 is connected in fluid communication with the radially outer channel section 82 by a plurality of connector passages 166 (FIG. 4). Similarly, the relatively small diameter second portion 162 of the inlet passage is connected in fluid communication with the radially inner channel section 82 by a plurality of connector passages 168. A flow of cooling fluid enters the inlet passage 70 (FIG. 4) at the inlet 68. A relatively large volume of the cooling fluid is conducted from the initial portion 160 of the inlet fluid passage 70 to the radially outer channel section 82. A smaller volume of cooling fluid is conducted from the relatively small second portion 162 of the inlet fluid passage 70 to the radially inner channel section 84.

The cylindrical initial portion 160 of the inlet passage 70 is disposed in a coaxial relationship with the cylindrical second portion 162 of the inlet passage. However, the central axis of the second portion 162 of the inlet passage 70 may be offset from the central axis of the initial portion 160 of the inlet passage. If desired, the initial portion 160 of the inlet passage 70 may be disposed to one side of the second portion 162 of the inlet passage so as to have one fluid flow path to the radially outer channel section 82 and a second, separate, fluid flow path to the radially inner channel section 84.

The radially outer channel section 82 extends in opposite directions from connector passages 166 (FIGS. 4 and 6) to the outlet passage 76. Thus, the radially outer channel section 82 extends in both a clockwise and a counterclockwise direction from the inlet passage 70 to the outlet passage 74. Similarly, the radially inner channel section 82 extends in opposite directions from the inlet passage 70 to the outlet passage 76. Thus, the radially inner channel section 84 extends in both a clockwise and counterclockwise direction (as viewed in FIG. 3) from the inlet 68 to the outlet 64 (FIG. 4). The fluid flow is equally divided, in the radially outer channel section 82, between the clockwise and counterclockwise flowing sections of the radially outer channel section. Similarly, the fluid flow is equally divided, in the radially inner channel section 84, between the clockwise and counterclockwise flowing sections of the radially inner channel section.

The outlet passage 76 (FIG. 4) has the same construction as the inlet passage 70. Thus, the cylindrical outlet passage 76 has a radially outer or exit portion 174 with a larger diameter than a radially inner or entrance portion 176. The fluid flowing in the radially inner channel section 84 is conducted to the entrance portion 176 through connector passages 180. Similarly, fluid is conducted from the radially outer channel section 82 to the exit portion 174 of the outlet passage 76 through connector passages 182.

The cylindrical exit portion 174 of the outlet passage 76 is disposed in a coaxial relationship with the cylindrical entrance portion 176 of the outlet passage. However, the central axis of the entrance portion 176 of the outlet passage 76 may be offset from the central axis of the exit portion 174 of the outlet passage. If desired, the entrance portion 176 of the outlet passage 76 may be disposed to one side of the exit portion 174 of the outlet passage so as to have one fluid flow path from the radially inner channel section 894 and a second, separate, fluid flow path from the radially outer channel section 82.

The inlet and outlet passages 70 and 76, which provide a greater rate of fluid flow to the radially outer channel section 82 than the radially inner channel section 84, may be utilized in association with cooling fluid channels having a construction which is different from the construction of the cooling fluid channel 64. Thus, the inlet and outlet passages 70 and 76 may be utilized in association with radially outer and radially inner channel sections 82 and 84 which do not have the projections 110 and 112 and/or the ribs 150.

When the coupling assembly 10 is in the disengaged condition of FIG. 2, the friction pads 24 and 26 on the disc 18 are slightly spaced from the axially movable pressure plate 40 and the stationary mounting flange or pressure plate 42. This enables the disc 18 to freely rotate relative to the stationary member 14 and housing assembly 32.

When the coupling assembly 10 is to be operated from the disengaged condition to the engaged condition, the piston 46 moves the pressure plate 40 axially toward the mounting flange or pressure plate 42 to firmly grip the disc 18 between the pressure plate 40 and mounting flange or pressure plate 42.

The mounting flange or pressure plate 42 has a construction which is similar to the construction of the pressure plate 40. Since the components of the mounting flange or pressure plate 42 are the same as the components of the pressure plate 40, similar numerals will be utilized to designate similar components, the suffix letter "a" being associated with the numerals relating to the mounting flange or pressure plate 42 in order to avoid confusion.

Figure 6:
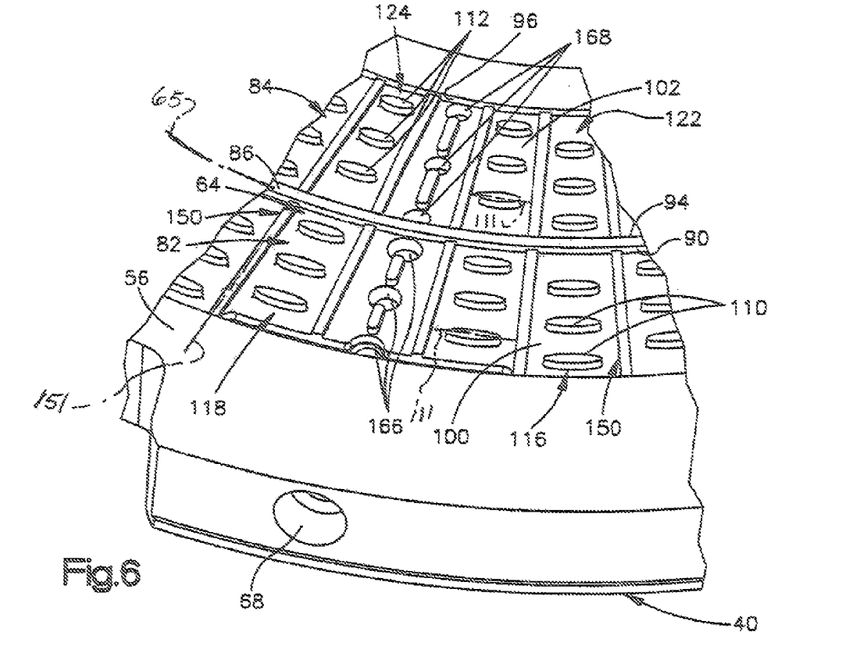
FIG. 6 is an enlarged fragmentary pictorial illustration of a portion of FIG. 5.

The mounting flange or pressure plate 42 includes a base 56a and a wear plate portion 60a. The wear plate portion 60a and base 56a are fixedly interconnected and cooperate to define a cooling fluid channel having the same construction as the cooling fluid channel 64 of FIGS. 3-7. The cooling fluid channel in the mounting flange or pressure plate 42 is divided into radially inner and radially outer cooling fluid channel sections, corresponding to the cooling fluid channel sections 82 and 84 of FIGS. 2-7, by an annular wall section or rib corresponding to the wall section or rib 86 of FIGS. 5-7. Projections, corresponding to the projections 110 and 112 of FIGS. 5-7, are provided in the cooling fluid channel sections. In addition, ribs, corresponding to the ribs 150 of FIGS. 5-7 are provided in the cooling fluid channel sections in the mounting flange or pressure plate 42.

The mounting flange or pressure plate 42 has a cooling fluid inlet 68a and a cooling fluid outlet 74a. Inlet and outlet passages, corresponding to the passages 70 and 76 of FIG. 4, are provided in association with the cooling fluid inlet 68a and the cooling fluid outlet 74a in the mounting flange or pressure plate 42.

In view of the foregoing description, it is apparent that the present invention provides a new and improved coupling assembly 10 having an improved flow of cooling fluid to promote the transfer of heat from components of the coupling assembly. Convective heat transfer from components of the coupling assembly 10 to the flow of cooling fluid is promoted by increasing the velocity of the cooling fluid at spaced apart areas along a channel 64 through which the cooling fluid flows. Upon engagement of the coupling assembly 10, more heat tends to be generated at a radially outer portion of a rotating disc 18 than at a radially inner portion of the disc. To remove this heat, the flow of cooling fluid adjacent to the radially outer portion of the rotating disc 18 may be larger than adjacent to the radially inner portion of the rotating disc.

The coupling assembly 10 may include the rotatable disc 18 which is at least partially enclosed by a housing 32. The housing 32 may have a plate portion 60 with an force transmitting surface which is engagable with a side surface area on the rotatable disc 18 to retard relative rotation between the housing and the disc. The housing 32 may also have a cooling fluid channel 64 which is at least partially defined by a side of the plate portion 60 opposite from the force transmitting surface.

To improve heat transfer and minimize the occurrence of hot spots, a plurality of projections 110 and 112 extend into the path of flow of cooling fluid through the cooling fluid channel 64. Turbulence may be induced in a flow of cooling fluid by having ribs 150 project into the cooling fluid channel 64.

A fluid inlet 68 to the cooling fluid channel 64 may have a relatively large cross sectional area portion 160 connected in fluid communication with a radially outer portion 82 of the cooling fluid channel. The inlet 68 may have a relatively small cross sectional area portion 162 connected in fluid communication with a radially inner portion 84 of the cooling fluid channel 64.

A coupling assembly 10 constructed in accordance with the present invention has many different features which may advantageously be utilized together as disclosed herein. However, these features may be utilized separately or in combination with various features from the prior art. For example, the cooling fluid inlet 68 with different sizes for radially inner and radially outer portions 82 and 84 of the cooling fluid channel 64 may be utilized without projections 110 and 112 into the cooling fluid channel. As another example, the projections may or may not include the ribs 150.

Although the coupling assembly 10 disclosed herein is utilized as a brake, it should be understood that the coupling assembly may be utilized as a clutch. It is also contemplated that the coupling assembly may be a combination clutch and brake assembly.

Having described the invention, the following is claimed:

1. A coupling assembly for use in transmitting force, said coupling assembly comprising a rotatable disc, and a housing which at least partially encloses said rotatable disc, said housing having a plate portion with a circular force transmitting surface which is engageable by a circular side surface area on said rotatable disc to retard relative rotation between said housing and said disc, a cooling fluid channel which has a circular configuration and is at least partially defined by a side of said plate portion opposite from said force transmitting surface, an inlet through which cooling fluid is conducted to said cooling fluid channel and an outlet through which cooling fluid is conducted from said cooling fluid channel, a wall portion which has a generally circular configuration and separates a radially outer portion of said cooling fluid channel from a radially inner portion of said cooling fluid channel, said wall portion is engaged by the side of said plate portion opposite from said force transmitting surface, first and second spaced apart ribs which extend from said wall portion across said radially outer portion of said cooling fluid channel, third and fourth ribs which extend from said wall portion across said radially inner portion of said cooling fluid channel, each of said ribs being spaced apart from the side of said plate portion opposite from said force transmitting surface to enable cooling fluid to flow along said radially outer portion of said cooling fluid channel across said first and second ribs throughout the length of said first and second ribs and to enable cooling fluid to flow along said radially inner portion of said cooling fluid channel across said third and fourth ribs throughout the length of said third and fourth ribs, a first plurality of projections disposed between and spaced apart from said first and second ribs, and a second plurality of projections disposed between and spaced apart from said third and fourth ribs, said first and second pluralities of projections being engaged by the side of said plate portion opposite from said force transmitting surface, said first plurality of projections being disposed in an array which is disposed radially outwardly of said wall portion, each projection in said first plurality of projections being located at a different radial distance from said wall portion, said second plurality of projections being disposed in an array which is disposed radially inwardly of said wall portion, each projection in said second plurality of projections being located at a different radial distance from said wall portion.

2. A coupling assembly as set forth in claim 1 wherein a first projection of said first plurality of projections has a first length along a longitudinal central axis of said first projection, said first length is less than a distance between said first and second ribs, a second projection of said first plurality of projections has a second length along a longitudinal central axis of said second projection, said second length is less than a distance between adjacent ribs of said second plurality of ribs, said first length being greater than said second length.

3. A coupling assembly as set forth in claim 1 wherein said inlet through which fluid is conducted into said cooling fluid channel includes an inlet passage having a first cylindrical portion which is connected in fluid communication with said radially outer portion of said cooling fluid channel and a second cylindrical portion which is connected in fluid communication with said radially inner portion of said cooling fluid channel, said first cylindrical portion of said inlet passage having a first diameter, said second cylindrical portion of said inlet passage having a second diameter, said first diameter being greater than said second diameter, said inlet passage being effective to conduct fluid flow from said first cylindrical portion of said inlet passage to said second portion of said inlet passage.

4. A coupling assembly as set forth in claim 1 wherein at least some of said projections of said plurality of projections have opposite end portions which are tapered.

* * * * *